(12) United States Patent
Kassner et al.

(10) Patent No.: US 11,629,972 B2
(45) Date of Patent: Apr. 18, 2023

(54) METHOD FOR CALCULATING AN AUGMENTED REALITY OVERLAY FOR DISPLAYING A NAVIGATION ROUTE ON AN AR DISPLAY UNIT, DEVICE FOR CARRYING OUT THE METHOD, MOTOR VEHICLE AND COMPUTER PROGRAM

(71) Applicant: Volkswagen Aktiengesellschaft, Wolfsburg (DE)

(72) Inventors: Astrid Kassner, Berlin (DE); Matthias Henning, Berlin (DE); Norwin Schmidt, Westerland (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 80 days.

(21) Appl. No.: 15/734,093

(22) PCT Filed: May 9, 2019

(86) PCT No.: PCT/EP2019/061982
§ 371 (c)(1),
(2) Date: Dec. 1, 2020

(87) PCT Pub. No.: WO2019/228779
PCT Pub. Date: Dec. 5, 2019

(65) Prior Publication Data
US 2021/0215499 A1    Jul. 15, 2021

(30) Foreign Application Priority Data
Jun. 1, 2018   (DE) ..................... 10 2018 208 703.2

(51) Int. Cl.
*G01C 21/36*    (2006.01)
*G01C 21/34*    (2006.01)

(52) U.S. Cl.
CPC ....... *G01C 21/365* (2013.01); *G01C 21/3415* (2013.01); *G01C 21/367* (2013.01); *G01C 21/3664* (2013.01)

(58) Field of Classification Search
None
See application file for complete search history.

(56) References Cited

U.S. PATENT DOCUMENTS

| 6,272,431 B1 | 8/2001 | Zamojdo et al. | 701/454 |
| 8,200,429 B2 | 6/2012 | Sasano | 701/467 |

(Continued)

FOREIGN PATENT DOCUMENTS

| DE | 102017211821 A1 | 1/1918 | B60R 16/02 |
| DE | 102018208703 A1 | 12/1919 | G01C 21/36 |

(Continued)

OTHER PUBLICATIONS

Machine translation of WO-2018070193-A1 (Year: 2018).*

(Continued)

*Primary Examiner* — Anne Marie Antonucci
*Assistant Examiner* — Kyle S Park
(74) *Attorney, Agent, or Firm* — Slayden Grubert Beard PLLC (57) ABSTRACT

The invention relates to a method for calculating an AR overlay of additional information for display on an AR display unit, in particular a head-up display of a vehicle or smart glasses. The AR overlay is used to display a navigation route on the AR display unit. The navigation route is recalculated from time to time by a navigation system. The method is characterized in that the AR overlay is calculated in such a way that the recalculated route is displayed at least at a certain first distance before a branch-off point, and the (Continued)

driver is given an operating option of switching back and forth between the overview of the recalculated route and the previously calculated route.

19 Claims, 8 Drawing Sheets

(56) References Cited

U.S. PATENT DOCUMENTS

| | | | |
|---|---|---|---|
| 8,831,883 B2 | 9/2014 | Breisinger et al. | ............ 701/533 |
| 9,222,795 B1 | 12/2015 | Gerlach | |
| 9,809,165 B1 | 11/2017 | Misu et al. | |
| 2004/0236507 A1 | 11/2004 | Maruyama et al. | .......... 701/437 |
| 2009/0005961 A1* | 1/2009 | Grabowski | .......... G01C 21/365 |
| | | | 701/532 |
| 2010/0292886 A1 | 11/2010 | Szczerba et al. | ............ 701/31.4 |
| 2012/0224060 A1* | 9/2012 | Gurevich | .................. B60R 1/00 |
| | | | 348/148 |
| 2014/0012501 A1 | 1/2014 | Hahne | ............................ 701/533 |
| 2014/0372025 A1 | 12/2014 | Yoshida | ......................... 701/467 |
| 2015/0062168 A1* | 3/2015 | Ng-Thow-Hing | ...... G06F 3/013 |
| | | | 345/633 |
| 2015/0253148 A1* | 9/2015 | Moore | ............... G01C 21/3484 |
| | | | 701/532 |
| 2016/0003636 A1* | 1/2016 | Ng-Thow-Hing | ... G06V 20/588 |
| | | | 701/418 |
| 2016/0155268 A1* | 6/2016 | Ko | ........................ G06T 19/006 |
| | | | 345/633 |
| 2016/0284125 A1* | 9/2016 | Bostick | ................... G06F 3/012 |
| 2017/0187963 A1* | 6/2017 | Lee | ......................... G06V 20/56 |
| 2017/0314945 A1 | 11/2017 | König et al. | |
| 2018/0067307 A1* | 3/2018 | Liubakka | ................... G06F 3/14 |

FOREIGN PATENT DOCUMENTS

| | | | |
|---|---|---|---|
| DE | 102007046038 A1 | 4/2009 | ........... G08G 1/0968 |
| DE | 102009011252 A1 | 9/2009 | ............ G01C 21/34 |
| DE | 102009047410 A1 | 6/2011 | ............ G01C 21/34 |
| DE | 102010052000 A1 | 5/2012 | ............ G01C 21/34 |
| DE | 102012013376 A1 | 1/2014 | ............ G01C 21/34 |
| DE | 102012215038 A1 * | 5/2014 | ........... G01C 21/365 |
| DE | 102013016241 A1 | 4/2015 | ............ G06T 15/20 |
| DE | 102015203446 A1 | 11/2015 | ............ G01C 21/32 |
| DE | 102017211821 A1 | 1/2018 | |
| EP | 1751499 B1 | 4/2012 | ............ G01C 21/32 |
| WO | 2018/044656 A1 | 3/1918 | ............ B60W 30/09 |
| WO | 2019/228779 A1 | 12/1919 | ............ G01C 21/36 |
| WO | WO-2018070193 A1 * | 4/2018 | ............ B60K 35/00 |

OTHER PUBLICATIONS

Machine translation of DE-102012215038-A1 (Year: 2014).*
Gabbard, Joseph L. et al., "Behind the Glass: Driver Challenges and Opportunities for AR Automotive Applications," Proceedings of IEEE, vol. 102, No. 2, pp. 124-136, Feb. 1, 2014.
German Office Action, Application No. 102018208703.2, 5 pages, dated Jan. 16, 2019.
International Search Report and Written Opinion, Application No. PCT/EP2019/061982, 21 pages, dated Sep. 2, 2019.

* cited by examiner

METHOD FOR CALCULATING AN AUGMENTED REALITY OVERLAY FOR DISPLAYING A NAVIGATION ROUTE ON AN AR DISPLAY UNIT, DEVICE FOR CARRYING OUT THE METHOD, MOTOR VEHICLE AND COMPUTER PROGRAM

CROSS-REFERENCE TO RELATED APPLICATIONS

This application claims priority to German Patent Application No. DE 10 2018 208 703.2, filed on Jun. 1, 2018 with the German Patent and Trademark Office. The contents of the aforesaid Patent Application are incorporated herein for all purposes.

TECHNICAL FIELD

The teachings herein relates to the technical field of driver information systems, which are also known under the term "infotainment systems". Systems of this kind are used above all in vehicles. However, there is also the possibility of the invention being used by pedestrians, cyclists, etc., if for example wearing smartglasses. The teachings further relate to a correspondingly designed device for carrying out the method and to a motor vehicle and a computer program.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

A vision of the future in the automotive industry is to be able to play virtual elements on the windscreen of a person's vehicle in order to bring certain benefits to the driver. So-called "augmented reality" (AR) technology is used. In AR, the real surroundings are augmented with virtual elements. This offers several benefits: There is no need to look down from the windscreen at other displays, since a lot of relevant information is displayed on the windscreen. Therefore, the driver does not have to divert their gaze from the road. The special feature of AR displays is that the virtual elements can be positioned accurately in the real surroundings. The virtual element is also overlaid in the location where the driver is directing their gaze in the real surroundings. By means of these overlays, the real surroundings can have elements "superimposed" on them and be provided with additional information from the point of view of the user, e.g. a navigation path can be overlaid. As a result, less cognitive effort is required from the driver, since they do not have to interpret an abstract graphic, but rather can intuitively understand the situation based on normal perceptual habits.

Currently, head-up displays (HUD) are used as AR display units in vehicles. These have the benefit that the HUD image appears closer to the real surroundings. These displays are actually projection units that project an image onto the windscreen. However, from the perspective of the driver, this image is a few meters to 15 meters away from the vehicle, depending on the design of the module. This has the benefit that the overlaid information is presented such that the eyes of the driver are relieved of the task of accommodating the information.

The "image" is composed as follows: It is less a virtual display than a type of "keyhole" into the virtual world. The virtual surroundings are theoretically laid over the real world and contain the virtual objects that assist and inform the driver during their journey. The limited display area of the HUD means that a section thereof can be seen. As a result, a driver can see through the display area of the HUD onto the section of the virtual world. Because these virtual surroundings supplement the real surroundings, this is referred to as "mixed reality".

At present, a considerable amount of work is being done on technologies that, it is hoped, will enable autonomous driving in the future. A first approach in this is not to completely relieve the driver of their tasks, but rather to make sure that the driver can take over control of the vehicle at any time. The driver also performs monitoring functions. By virtue of newer technologies in the field of driver information systems such as head-up displays, it is possible to better inform the driver of what is happening in the surroundings of their vehicle.

Based on the current trend toward greater levels of autonomy, but with many vehicles still being controlled by the driver, it can be assumed that it will be possible to use corresponding additional information for manually driven vehicles in the medium term and not just for highly automated systems in the long term. In this context, the solution described in the following can be used both for manually controlled and for automatically controlled vehicles.

With regard to vehicle-driver interaction, the question arises as to how this information can be displayed such that genuine added value is created for the human driver and such that they can also locate the information provided quickly and intuitively.

The following solutions in this field may be known from the prior art.

Most vehicles today have a navigation system that provides a driver with destination and road guidance. Furthermore, vehicles equipped with a HUD are offered on the market, the HUD projecting the desired information onto the windscreen of a vehicle and allowing the driver to view the projected information while they are looking forwards.

Examples usually relate to the field of navigation. While classic navigation displays (with conventional LCD displays) generally show schematic representations (e.g. an arrow pointing 90 degrees to the right to indicate that the driver should turn off right at the next available opportunity), AR displays offer substantially more effective possibilities. Because the displays can be shown as "part of the surroundings", the user can make interpretations extremely quickly and intuitively. Nevertheless, approaches known to date also throw up various problems to which no solutions are currently known. This has been recognized by the inventors.

The navigation function inside a vehicle will, in future, be increasingly supported by images on a head-up display (augmented or with 2D maneuver displays). In order to assist the user with constant road and route guidance, the system augments a navigation path directly onto the road.

If changes to the route are required on account of traffic disturbances, traffic jams, diversions, etc., current navigation devices calculate a new navigation route and inform the user of the recalculation. However, to date, no information or visualization is provided as to what has changed about the route. This means that the new course of their journey is not visible to the user and the user is only involved when the navigation device issues spoken instructions regarding the imminent driving maneuver. This problem has been recognized by the inventors.

There is a need for further improvements to route guidance in vehicles and to the corresponding feedback to the driver via the infotainment system.

SUMMARY

An object exists to better assist the driver in the event of route changes.

The object is solved by a method for calculating an "augmented reality" overlay for displaying a navigation route on an AR display unit, a device for carrying out the method, as well as a motor vehicle and a computer program according to the independent claims. Embodiments of the invention are discussed in the dependent claims and the following description.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a first exemplary aspect, a method for calculating an AR overlay for displaying a navigation route on an AR display unit is provided that comprises calculating the AR overlay such that the recalculated route is overlaid at least at a certain first distance before a branch-off point, and wherein the driver is given an operating option of switching back and forth between the display of the route overview of the recalculated route and the previously calculated route. According to the method, the navigation route is calculated by a navigation system, wherein the navigation route is recalculated by the navigation system from time to time. In order to recalculate the route from time to time, the system can also consider specific criteria and then itself decide whether the route is recalculated. If, for example, time delays have been identified on the current route or time savings have been identified on alternative routes, the route can be recalculated. This method has the benefit that the system recommends an alternative route and displays same in the immediate field of vision of the user. The driver is not distracted and instead is able to quickly assess the new route. This operating option gives the driver the option of comparing both routes with one another.

The overlay serves to assist the driver with the longitudinal guidance of the vehicle.

The user obtains an overview of the originally calculated route in combination with the new route recommendation and may decide on one of the two options (for example with priority for the new recommendation) based on the various routes. If the information regarding the likely travel time for the relevant route is also displayed (minutes to destination), the user may thus save time when choosing the route with the shorter travel time.

Exemplary embodiments provide calculating an AR overlay before the recalculated route is overlaid such that the driver is given an indication of the recalculated route, with an operating suggestion as to how the driver can have the recalculated route overlaid.

In order to obtain an overview of the route, it is possible in some embodiments if the AR overlay for displaying the recalculated route and the previously calculated route is calculated such that the course of the relevant route is displayed up to the destination.

Some embodiments provide calculating the AR overlay for the route overview such that it is zoomable, wherein a zooming operation can for example be carried out by operating the steering wheel. This is convenient for the driver if they would like to have a more detailed view of the routes.

In some embodiments, prior to the route overview being overlaid, the driving situation is assessed and the route overview is only overlaid if the result of the driving situation assessment is that the driving situation does not require increased attention from the driver. This minimizes the potential of distracting the driver.

In some embodiments, an AR overlay is calculated at a certain second distance before the branch-off point such that the recalculated route is displayed next to the previously overlaid route, wherein the navigation path for one of the two routes extends to the branch-off point and the other navigation path continues past the branch-off point. The driver therefore has a clear visual indication that the two routes separate at this point and that they must decide which route to follow.

In some embodiments, the AR overlay for displaying the recalculated route is calculated such that it has a different color to the AR overlay for showing the previously calculated route. This makes it even easier to distinguish between the routes.

In some embodiments, the route that would take the most time is displayed in a red or orange color and if the route that is more attractive in terms of time is displayed in a blue or green color. This corresponds to the typical display method if one option is intended to be portrayed as beneficial compared to the other option.

As soon as the driver has decided on one of the two routes, the route not followed by the vehicle may be hidden in some embodiments. The navigation system may use position tracking to identify which route the vehicle is following. Position tracking is also known as "GPS tracking". The navigation system evaluates the current position of the vehicle. After the branch-off point, the vehicle can only be on one of the two routes. Then, the other route can be hidden.

In some embodiments, the navigation system identifies which route the vehicle is following sooner by the turn signal being activated or by means of a corresponding user input via an operating unit or a spoken command.

With regard to another exemplary aspect and a device for carrying out the method according to the first exemplary aspect, it is beneficial if the device comprises an AR display unit, a computing unit, and a navigation system. A navigation route is calculated by the navigation system, wherein the navigation system is designed to recalculate the navigation route from time to time in order to adapt to changing conditions, in particular traffic conditions. The computing unit carries out the steps for calculating an AR overlay. The computing unit is designed to calculate the AR overlay such that, at least at a certain first distance before a branch-off point, the recalculated route is overlaid together with an operating option by means of which the driver can switch back and forth between the display of the recalculated route and the previously calculated route.

In some embodiments, the device is designed such that the correspondingly programmed computing unit carries out the calculations of AR overlays that are performed in the corresponding method steps.

The AR display unit may in some embodiments be designed as a head-up display HUD or as smartglasses that are worn by the driver.

Otherwise, the same benefits as those mentioned with regard to the claims containing the corresponding method steps apply to the device for carrying out the method using the correspondingly programmed computing unit.

In some embodiments, the display unit of the device is designed as a head-up display. However, instead of a head-up display, smartglasses worn by the driver, or a monitor, on which a camera image into which the AR overlay is inserted is displayed, may be used as the display unit in the device.

The device according to the present exemplary aspect can be used in a motor vehicle in some embodiments. It may be implemented in a vehicle such that the display unit is permanently installed in the vehicle, e.g. in the form of a head-up display. However, the present exemplary aspect could possibly also be implemented using smartglasses if, in future, the use of smartglasses is permitted when driving.

As already mentioned, the present teachings may also be used if the display unit is in the form of smartglasses. In this case, the method could be used by pedestrians, cyclists, motorcyclists, etc.

With regard to a computer program executed in the computing unit of the device in order to carry out the method, the same benefits as described in relation to the method apply.

Exemplary embodiments are shown in the drawings and explained in greater detail in the following with reference to the FIGS.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

It should be understood that a person skilled in the art will be able to conceive various arrangements which, although not explicitly described here, embody principles of the disclosure and are thus considered to be within the scope of the disclosure.

Figure 1:
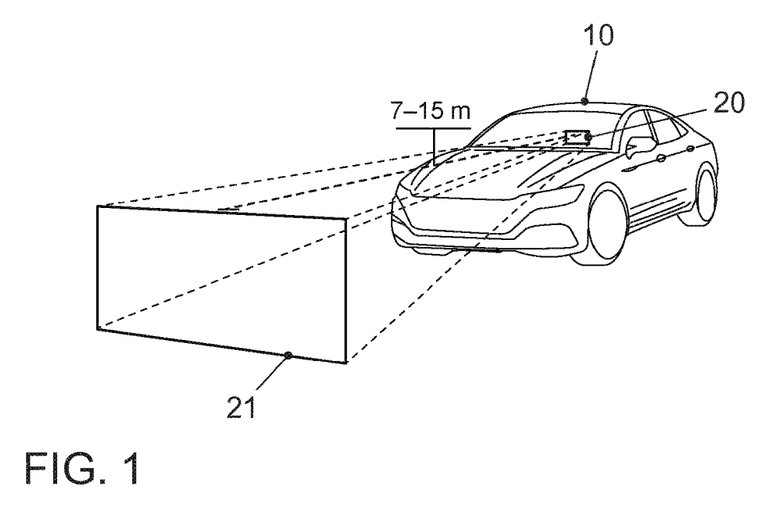
FIG. 1 shows an exemplary principle of overlaying information in the field of vision of the driver of a vehicle during travel by means of a head-up display.

FIG. 1 illustrates the operating principle of a head-up display. The head-up display 20 is fitted below/behind the instrument cluster in the dashboard region of the vehicle 10. Additional information is overlaid in the field of vision of the driver by means of projection onto the windscreen. This additional information appears as if projected onto a projection surface 21 at a distance of 7-15 m in front of the vehicle 10. However, the real world remains visible through this projection surface 21. Virtual surroundings are, as it were, created by the overlaid additional information. The virtual surroundings are theoretically laid over the real world and contain the virtual objects that assist and inform the driver during their journey. However, the projection takes place only on part of the windscreen, and therefore the additional information cannot be arranged randomly in the field of vision of the driver.

Figure 2:
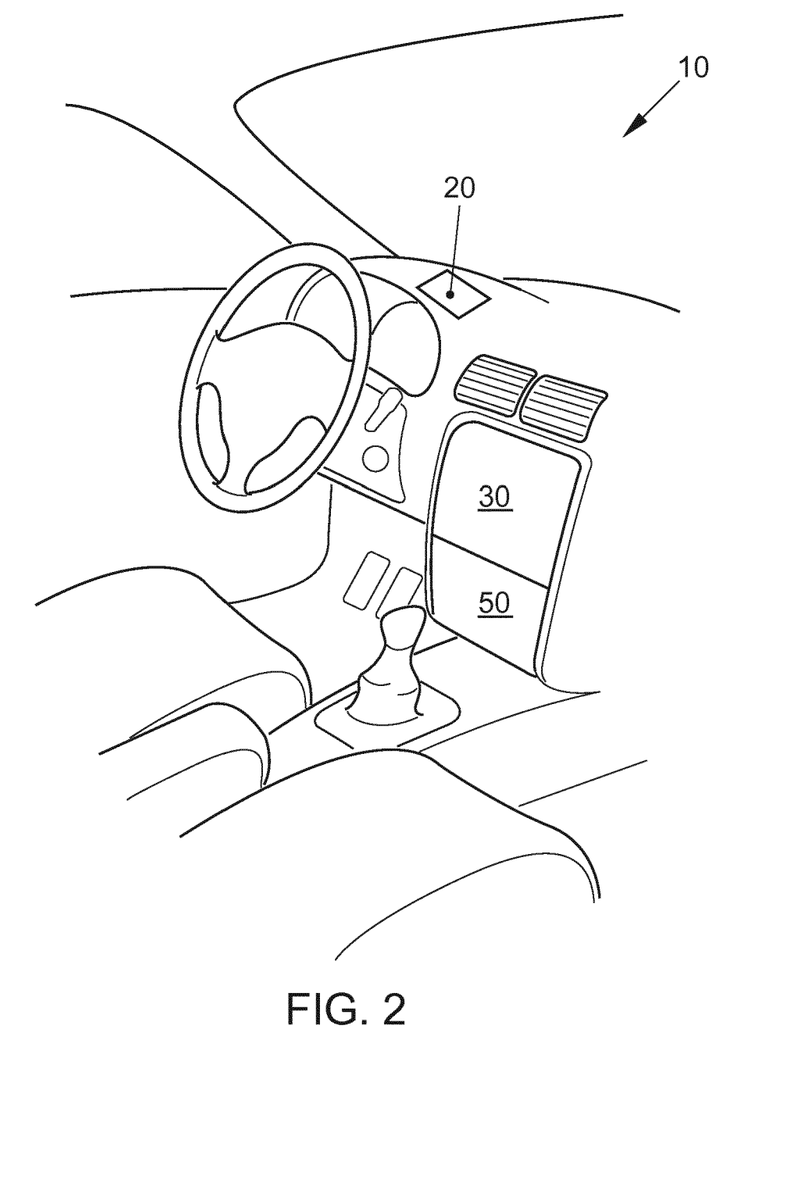
FIG. 2 shows an exemplary cockpit of a vehicle.

FIG. 2 shows the cockpit of the vehicle 10. A passenger vehicle is shown. However, any other type of vehicle is conceivable as the vehicle 10. Examples of other vehicles include: buses, commercial vehicles, in particular trucks, agricultural machines, construction machines, railway vehicles, etc. It is generally possible to use the embodiment in land vehicles, railway vehicles, watercraft and aircraft.

Two display units of an infotainment system are highlighted with reference signs in the cockpit. These are the head-up display 20 and a touch-sensitive screen 30, which is fitted in the center console. During travel, the center console is not in the field of vision of the driver. Therefore, the additional information is not overlaid on the display unit 30 during travel.

The touch-sensitive screen 30 is used, in particular, to operate functions of the vehicle 10. For example, it may be used to control a radio, a navigation system, playback of saved songs and/or an air-conditioning system, other electronic apparatuses or other convenience functions or applications of the vehicle 10. Taken together, this is generally referred to as an "infotainment system". In the case of motor vehicles, in particular passenger vehicles, an infotainment system refers to the combination of a car radio, navigation system, hands-free apparatus, driver assistance system and other functions in a central operating unit. The term "infotainment" is a portmanteau of the words "information" and "entertainment". The touch-sensitive screen 30 (touchscreen) is mainly used to operate the infotainment system, wherein this screen 30 can be easily viewed and operated by a driver of the vehicle 10, in particular, but also by a passenger of the vehicle 10. In addition, mechanical operating elements, such as buttons, knobs or combinations thereof, such as push-and-turn knobs, may be arranged in an input unit 50 below the screen 30. Typically, it is also possible to operate parts of the infotainment system using the steering wheel. This unit is not shown separately, but rather is considered part of the input unit 50.

Figure 3:
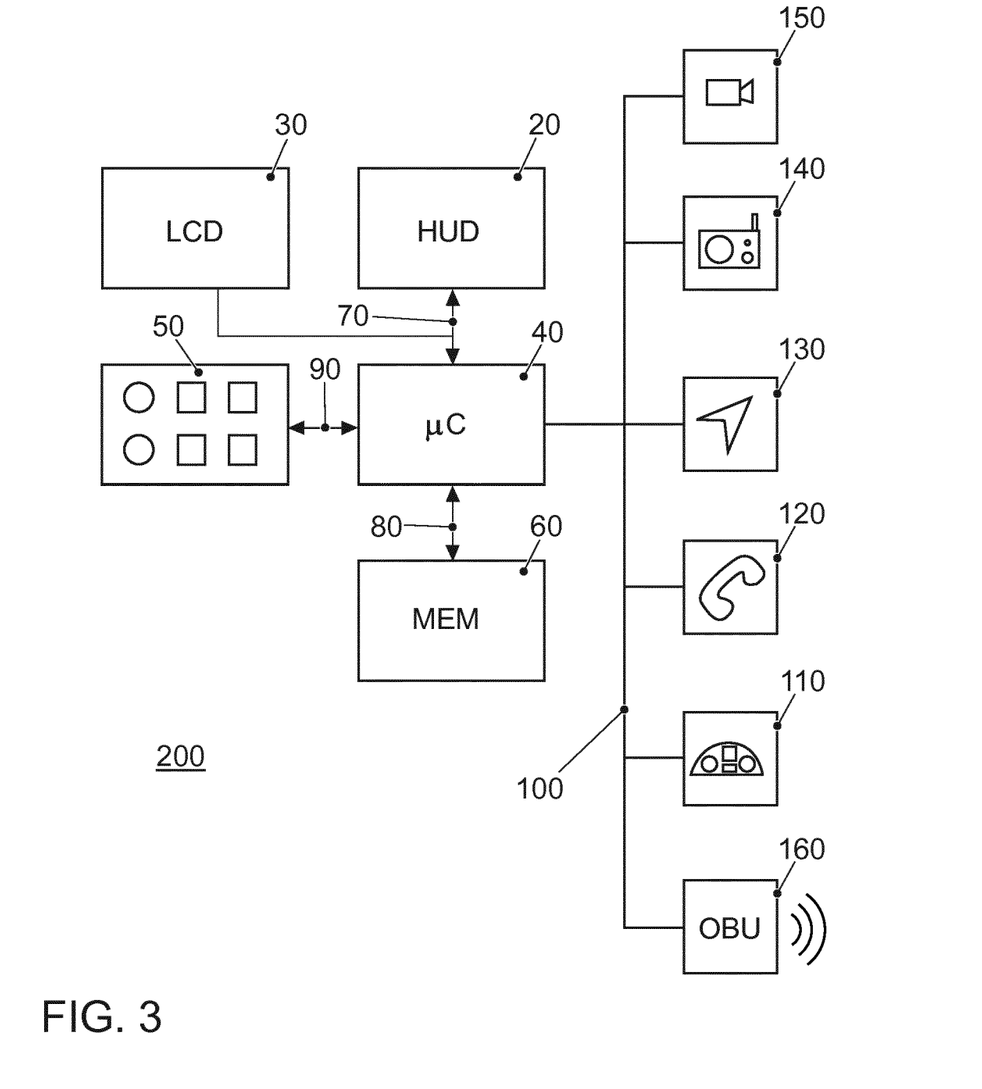
FIG. 3 shows an exemplary block diagram of the infotainment system of the vehicle.

FIG. 3 schematically shows a block diagram of the infotainment system 200 and, by way of example, some subsystems or applications of the infotainment system. The control device comprises the touch-sensitive display unit 30, a computing apparatus 40, an input unit 50 and a memory 60. The display unit 30 comprises a display surface for displaying changeable graphical information and also a user interface (touch-sensitive layer) arranged over the display surface for the input of commands by means of a user.

The display unit 30 is connected to the computing apparatus 40 via a data line 70. The data line may be designed in accordance with the LVDS (low-voltage differential signaling) standard. The display unit 30 receives control data for controlling the display surface of the touchscreen 30 from the computing apparatus 40 via the data line 70. Control data relating to the input commands are also transmitted from the touchscreen 30 to the computing apparatus 40 via the data line 70. The input unit is denoted by the reference number 50. It includes the already mentioned control elements such as keys, knobs, slide controls or push/twist controls with which the operator can make entries using the menu guide. Input should generally be understood to mean dialing up a selected menu option as well as modifying a parameter, switching a function on/off, etc.

The memory apparatus 60 is connected to the computing apparatus 40 via a data line 80. A pictogram directory and/or symbol directory comprising the pictograms and/or symbols for the possible overlaying of additional information is stored in the memory 60. The points/symbols used as the basis for the calculation of the grid overlay may also be stored here.

The other parts of the infotainment system, camera 150, radio 140, navigation device 130, telephone 120 and instrument cluster 110, are connected via the data bus 100 to the device for operating the infotainment system. The high-speed variant of the CAN bus according to ISO standard 11898-2 is conceivable as the data bus 100. Alternatively, a bus system based on Ethernet technology, such as BroadR-Reach, may also be used, for example. Bus systems that use optical waveguides for the data transmission may also be used. The MOST (Media Oriented System Transport) bus or D2B bus (Domestic Digital Bus) can be cited as examples of this. It should at this point be noted that the camera 150 may be designed as a conventional video camera. In this case, the camera records 25 full images per second, which corresponds to 50 half images per second in the interlaced recording mode.

Alternatively, a special camera may be used which records more images per second in order to increase the accuracy of the object recognition in the case of objects that move faster. A plurality of cameras may be used to monitor the surroundings. Additionally, the RADAR or LIDAR systems mentioned above could also be used in addition or as an alternative in order to carry out or supplement the monitoring of the surroundings. The vehicle 10 is equipped with a communication module 160 for the inward and outward wireless communication. Said module is often referred to as an on-board unit. It may be configured for mobile telecommunication, e.g., according to the LTE (Long-Term Evolution) standard. Equally, it may be configured for WLAN (wireless local area network) communication, be it for communicating with devices of the vehicle occupants or for vehicle-to-vehicle communication, etc.

The method according to the present discussion for calculating an AR overlay of additional information for a display on an AR display unit 20 will be explained in the following based on two exemplary embodiments.

In the remaining FIGS., the same reference numbers refer to the same fields and symbols as in the description of FIGS. 1 to 3.

Figure 4:
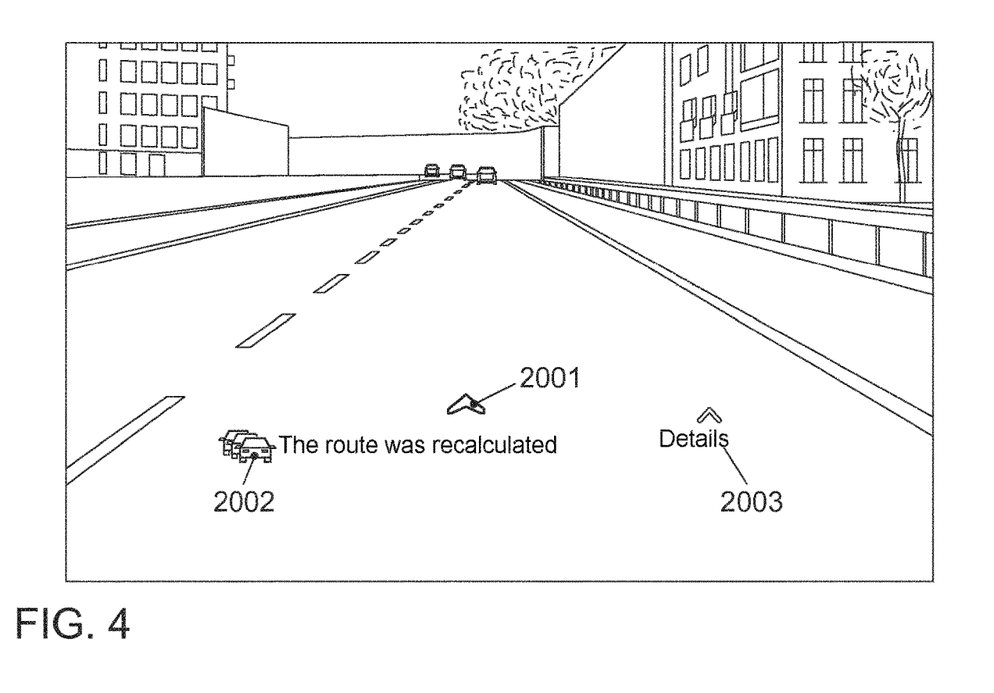
FIG. 4 shows an exemplary representation of an AR overlay for the driver with an indication that the route has been recalculated.

Firstly, the sequence for visualizing route changes further away (outside the field of vision) will be considered. FIG. 4 shows that the vehicle 10 is being guided along the selected route by the navigation system 130. It shows an example of minimalistic route guidance, in which only the navigation arrow 2001 is overlaid in order to show that the vehicle is traveling on the set route. From time to time, the navigation system 130 recalculates the route. If another route proves to be beneficial compared to the previous route based on one or more criteria, an indication 2002 that the route has been recalculated is overlaid for the driver.

Possible criteria for assessing the route include:
Distance
Travel time
Energy consumption
Road quality
Traffic volume.

This list is not exhaustive and other criteria may also be considered, individually or in combination with one or more of the other criteria.

If the branch-off point for the new route is sufficiently far away and not within sight, only the indication 2002 that the route has been recalculated appears initially. In order to assess whether the distance to the branch-off point is great enough, a certain minimum distance, e.g. 5 km, can be programmed. Together with the indication of the recalculated route 2002, an operating suggestion 2003 as to how additional details regarding the recalculated route can be displayed can be overlaid.

The user therefore has the option to have a route overview of the recalculated route overlaid. To do this, the driver dials up the option for the detailed view 2003 by operating the multifunction steering wheel (MFSW). The new route is then overlaid by means of the HUD 20. By way of example, the detailed view can be dialed up by pressing the MFSW up arrow key of the MFSW.

Figure 5:
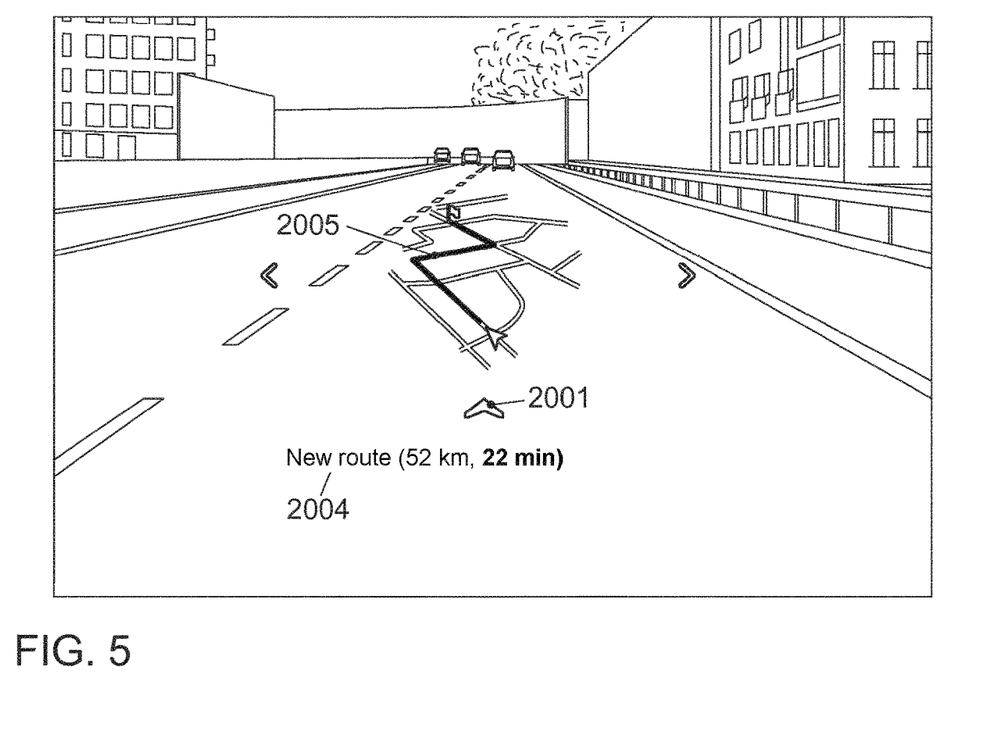
FIG. 5 shows an exemplary representation of an AR overlay for the driver with a visualization of a route overview of the recalculated route with a selection option for switching to the display for the previously calculated route.

The route overview for the new route is shown in FIG. 5 and has the reference number 2005. The course of the recalculated route is shown crudely. The starting point is represented by the typical navigation arrow. The finishing point of the route is also marked by a flag. The route overview shows the route in blue, for example. The other surrounding roads are represented in the manner of a map in another color, for example gray. The navigation arrow 2001 and the indication 2004 containing the information that the new route covers a travel distance of 52 km, corresponding to an estimated travel time of 22 min, are shown below the route 2005. To the left and right of the route, two arrow keys 2006 are shown, which are to be interpreted as operating suggestions. By pressing the right arrow key or the left arrow key, it is possible to switch back and forth between the route overview for the various alternative routes.

Figure 6:
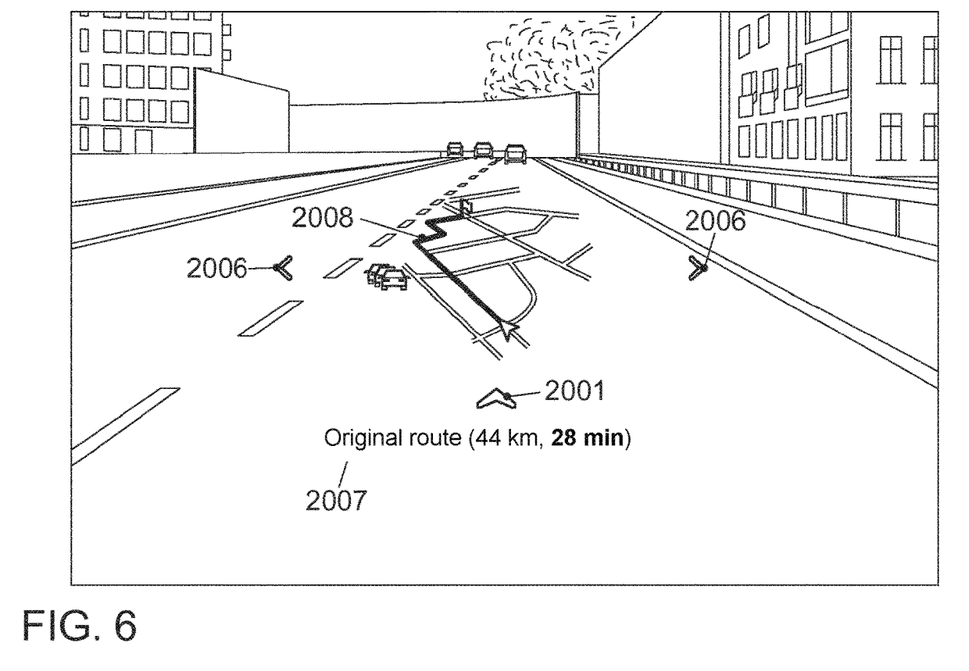
FIG. 6 shows an exemplary representation of an AR overlay for the driver with a visualization of a route overview of the original route with a selection option for switching to the display for the recalculated route.

FIG. 6 shows the route overview 2008 for the original route. The original route is shown in another color. For example, red is used for this. Below the original route are the navigation arrow 2001 and the indication 2007 that it is the original route with a travel distance of 44 km and travel time of 28 min. The arrow keys 2006 can again be seen next to the route overview. In another selection variant, both routes 2005 and 2008 are shown at the same time. This makes it easier for the driver to evaluate the difference between the two routes.

The other operations of the MFSW can be performed using the following keys. The OK key (confirmation key) is used to adopt the displayed route for the navigation system 130. One MFSW key (Back or down arrow) is used to exit the overview again.

It is beneficial if the following rules are followed for displaying the route overviews:

The route that takes more time should be denoted by an orange or red color in order to indicate that there is a more attractive route. The more attractive route should be displayed in the color of the active route (e.g. blue). The relevant required time should be shown for both routes. Alternatively, it is possible merely to indicate the additional time required for the route with the longer travel time.

The type of road should be indicated by means of color coding for the recalculated route. For the driver, it is useful to know, especially on longer journeys, for example, whether they can continue the new route on a highway or whether they are diverted onto an ordinary road or whether, for example, toll roads have been selected.

The proposed route overview should be zoomable by operating the steering wheel, such that it is possible to view even short route changes.

The route overview (on account of its size and planarity) should only be displayed in non-demanding driving situations. Alternatively, it is conceivable to limit displaying the route overview to situations in which the vehicle is stationary. Additionally, it is conceivable to display the route overview on the display unit 30 in the center console.

In the following, an exemplary embodiment will be described which enables visualization of route changes immediately in front of the vehicle.

Figure 7:
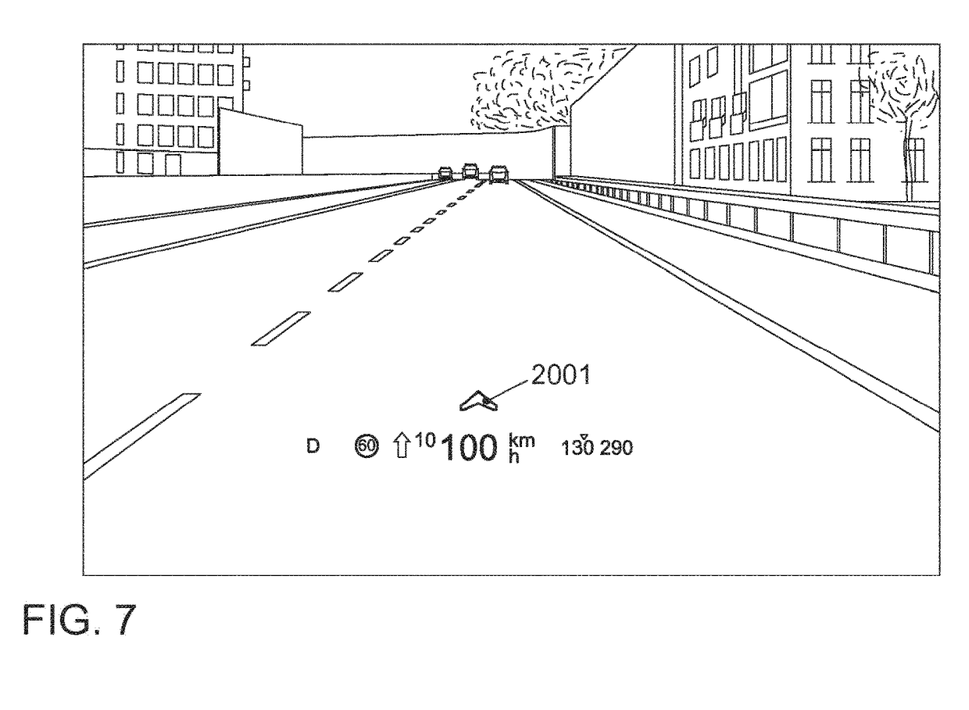
FIG. 7 shows an exemplary representation of an AR overlay for the driver with a reduced navigation display for the case where no special driving maneuvers are imminent.

The starting situation is shown in FIG. 7. As in FIG. 4, this is also a reduced navigation view. Based on the navigation arrow 2001, the user recognizes that navigation is active, but that no immediate driving maneuver is to be performed. If a driving maneuver were necessary, the user would be notified of this sufficiently in advance. In this case, an augmented navigation path 2009 proceeds from the reduced navigation display. This can be seen in FIG. 8. The reduced view and the navigation path are represented by the same graphical element (the navigation arrow 2001 or a point), which is augmented at a specific distance onto a fixed point on the road. The vehicle 10 then drives over the navigation arrows displayed.

Figure 9:
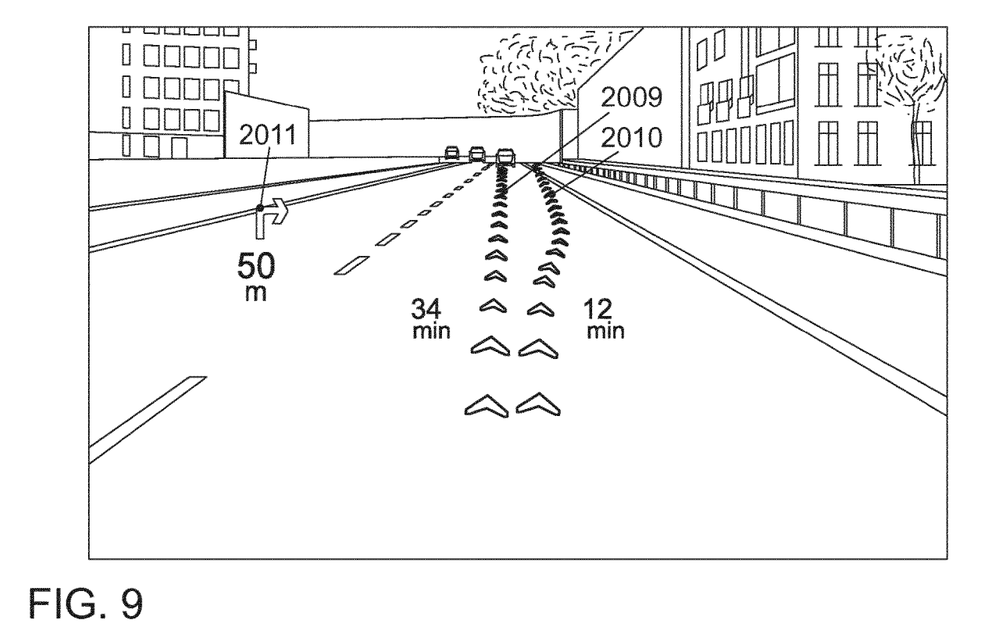
FIG. 9 shows an exemplary representation of an AR overlay for the driver with a representation of the current and of a recalculated navigation path for the case where a turn-off driving maneuver is imminent.

When a new route is recommended, the new route is displayed alongside the originally calculated route. The routes are color-coded: The original route with a longer journey time to the destination is red (or orange), whereas the new recommendation is displayed in the usual navigation color (e.g. blue). In addition, the delay time for both route recommendations is also displayed. This is shown in FIG. 9. The original route in red is denoted by the reference number 2009. The new route is denoted by the reference number 2010 and is displayed in blue. A suggestion to turn off 2011 is also shown in FIG. 9. This indicates that a driving maneuver is coming up in a distance of 50 m. The driver must decide which route they want to take. In addition to the option of both routes being displayed one next to the other, in an alternative embodiment, the recalculated route recommendation (blue) can be overlaid such that the original route 2009 (red) is pushed to the left thereby.

The new route recommendation can be accepted automatically by the user following the new route recommendation. As already described, this can be detected by means of position tracking when the vehicle reaches the branch-off point. The new route is then automatically adopted and the original route is hidden.

In an alternative embodiment, the choice of route can be recognized intelligently as a user intention by means of the turn signal and adopted.

In another alternative embodiment, the user actively selects one of the two routes. This may be done via an operating menu, e.g. using the MFSW [clicking to the left or right and pressing the confirmation/OK button] or by means of a spoken command.

Figure 10:
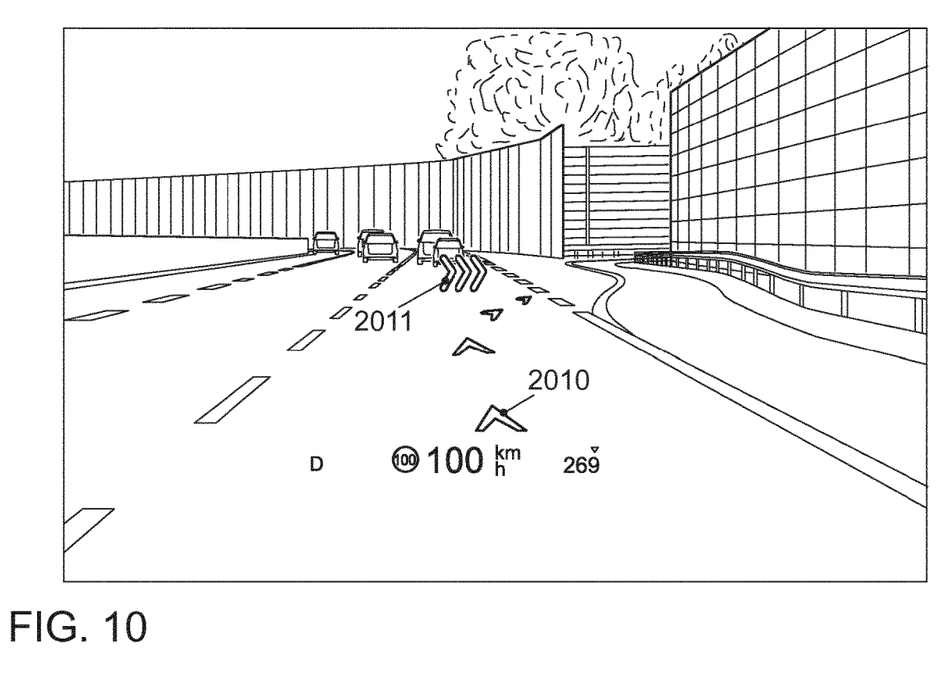
FIG. 10 shows an exemplary representation of an AR overlay for the driver with a representation of the recalculated navigation route selected by the driver.

FIG. 10 shows a moment where the driver has already selected the new route, for example by actuating the turn signal to the right. The original route has already been hidden. The navigation path that should be followed is indicated by navigation arrows 2010. A suggestion to turn off 2011 is augmented onto a fixed point on the road at the branch-off point.

Figure 11:
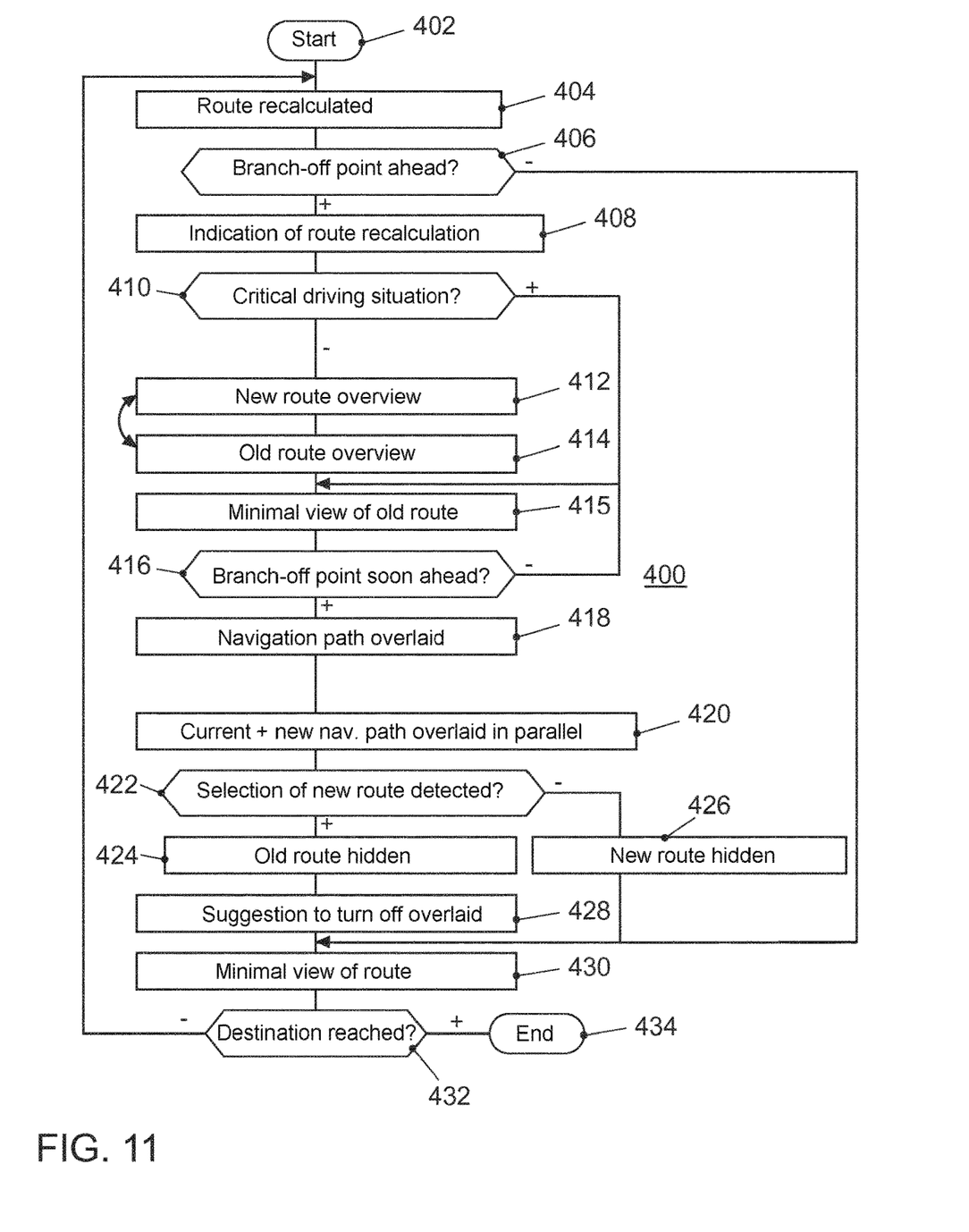
FIG. 11 shows an exemplary flow diagram for a program for calculating AR overlays for displaying various navigation routes.

A computer program 400 for calculating the AR overlays for the various routes will now be explained based on FIG. 11. The program 400 is executed in the computing unit 40. The start of the program is denoted by the reference number 402. The regular recalculation of the route takes place in program step 404. The recalculation takes place cyclically in order to take account of changing traffic conditions such as traffic jams, accidents, breakdowns and roadworks.

Then, in program step 406, it is queried whether a branch-off point is ahead by a specific distance, e.g. at least 5 km, according to one of the routes found. If not, the program jumps to step 430. Otherwise, in step 408, an AR overlay is calculated for the indication 2002 of the route recalculation, as shown in FIG. 4.

If the driver requests the detailed view of the recalculated route, the driving situation is evaluated in program step 410. At this stage, a special driving maneuver, e.g. a cooperative braking maneuver, that is intended to prevent a rear-end collision can be announced by means of car-to-car communication. This would be important, for example, in the case of intelligent convoy driving involving a plurality of vehicles, i.e. platooning. Another possibility would be for a driver assistance system to detect a special driving situation, be it that the distance from the vehicle in front is too short or that the speed is too high. Other examples are also conceivable.

If a driving situation of this kind is not detected, the AR overlay for the route overview 2005 is calculated for the recalculated route in step 412. The overlay is shown in FIG. 5.

The driver can use the right and left directional keys to switch between the proposed routes. Therefore, if the route overview for the original route is dialed up by the driver, in step 414 the AR overlay for the route overview of the original route is calculated, as shown in FIG. 6.

Then, in step 416, the program checks whether a branch-off point at which the vehicle 10 should turn off according to one of the proposed routes is ahead by a short distance. The short distance could be in the region of 2 km or less. Other values are also possible. If this is not the case, in step 415, an AR overlay is calculated for a minimalistic route overlay. A minimalistic route overlay of this kind is shown in FIG. 7.

Figure 8:
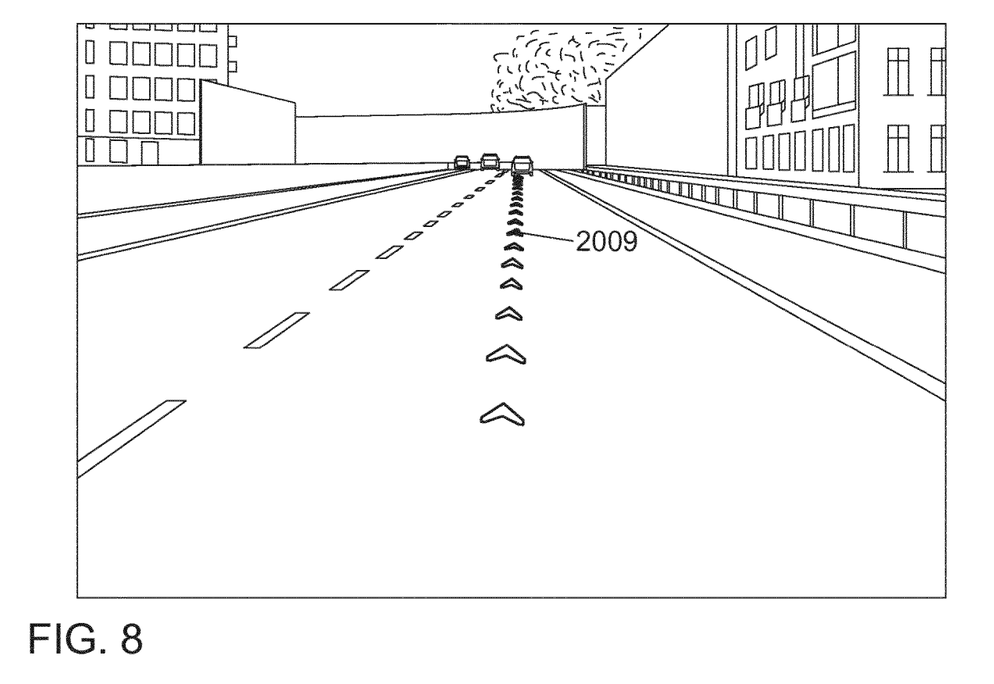
FIG. 8 shows an exemplary representation of an AR overlay for the driver with a representation of the current navigation path for the case where a driving maneuver is imminent.

Afterwards, the program jumps again to query 416. If it is recognized that the waypoint at which the vehicle must turn off is a short distance ahead, the AR overlay for displaying the current navigation path is calculated in step 418. This overlay is shown in FIG. 8. It is used to display that a driving maneuver is imminent. The driver is alerted to this.

When the vehicle has advanced further, the display changes. For this purpose, the AR overlay for the parallel display of the original route 2009 and the recalculated route 2010 is calculated in step 420. This AR overlay is shown in FIG. 9. The turn-off arrow 2011 and the information relating to the travel times for the two routes are also part of the calculated AR overlay.

In the following query 422, it is determined which route the driver selects. This can be identified by the turn signal for a turn-off operation being activated. The other possibility already mentioned relates to position tracking, which has already been mentioned above. In this case, however, the choice of route is identified slightly later, because both routes still proceed in an identical manner up to the branch-off point.

If activation of the turn signal has been detected in query 422, the program jumps to step 424, in which a new AR overlay is calculated. The original route 2009 is therefore hidden.

Step 428 follows, in which another AR overlay is calculated. The new route 2010 is displayed in this overlay as shown in FIG. 10. The turn-off arrow 2011 is augmented onto the road such that it appears to be at a fixed point on the branch-off point.

If neither activation of the turn signal nor selection of the new route 2010 is detected in step 422, another AR overlay is calculated in step 426. The recalculated route 2010 is hidden in this overlay and the original route 2009 is retained.

Then, in step 430, the switch to minimalistic route guidance takes place. In step 430, the corresponding AR overlay is calculated. This step is also carried out if the new route 2010 has been selected. The minimalistic view will be similar to that shown in FIG. 7.

Finally, in step 432, it is queried whether the destination of the navigation route has been reached. If this is not the case, the program jumps to the beginning of the program and the route recalculation in step 404 takes place again.

A loop is therefore formed in the program between steps 404 and 432, and this loop is repeated until it is detected in query 432 that the planned navigation destination has been reached. If this is the case, the program is terminated in program step 434. If the driver intervenes and exits the convenience function, the program can be terminated at any time.

It should be understood that all examples mentioned herein and conditional phrases used herein are not restricted to such specifically cited examples. A person skilled in the art would therefore recognize, for example, that the block diagram shown here is a conceptual view of an exemplary circuit arrangement. Similarly, it should be acknowledged that any flow diagram, state transition diagram, pseudocode and the like shown are different variants for demonstrating processes which can substantially be stored in computer-readable media and which can therefore be executed by a computer or processor. The object mentioned in the patent claims may also expressly be a person.

It should be understood that the proposed method and the associated devices can be implemented in various forms of hardware, software, firmware, special processors or a combination thereof. Special processors may include application-specific integrated circuits (ASICs), reduced instruction set computers (RISCs) and/or field-programmable gate arrays (FPGAs). For example, the proposed method and the device are implemented as a combination of hardware and software. The software may be installed as an application program on a program memory device. Typically, said device is a machine based on a computer platform that comprises hardware, such as one or more central processing units (CPUs), a random-access memory (RAM) and one or more input/output (I/O) interfaces. Typically, an operating system is also installed on the computer platform. The various processes and functions described here may be part of the application program or a part executed by means of the operating system.

The disclosure is not limited to the above-described exemplary embodiments. There is scope for various adaptations and modifications that a person skilled in the art would consider based on their knowledge in the art and in connection with the present disclosure.

The invention is explained herein in greater detail in the exemplary embodiments based on the example of vehicular use. It should be noted that the invention could also be used in airplanes and helicopters, for example for landing maneuvers or search missions, etc.

However, it should also be noted that use of the invention is not limited thereto. The invention can be used whenever AR overlays can augment the field of view of a driver, operator or simply a person wearing smartglasses.

AR overlays can also simplify operation in the case of remote-controlled devices such as robots, where the remote control takes place via a monitor on which a camera image is displayed. This therefore also constitutes a usage option.

LIST OF REFERENCE NUMERALS

10 Vehicle
20 Head-up display HUD
21 Virtual projection surface
30 Touch-sensitive display unit
40 Computing unit
50 Input unit
60 Memory unit
70 Data line to display unit
80 Data line to memory unit
90 Data line to input unit
100 Data bus
110 Instrument cluster
120 Telephone
130 Navigation device
140 Radio
150 Camera
160 Communication module
200 Infotainment system
400 Computer program
402—Various
445 program steps
2001 Navigation arrow
2002 Indication of route recalculation
2003 Operating suggestion for detailed view
2004 Indication of new route
2005 Route overview of new route
2006 Operating suggestion to switch to view of other route
2007 Indication of original route
2008 Route overview of original route
2009 Navigation path for original route
2010 Navigation path for new route
2011 Suggestion to turn off The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for displaying an augmented reality (AR) overlay of navigation routes of a vehicle on an AR display unit in an immediate field of vision of a driver, wherein a navigation route to a destination is determined by a navigation system, comprising:
    recurrently determining a current position of the vehicle;
    determining, using the current position, whether at least one alternate route to the destination exists;
    generating the AR overlay such that an indication of the at least one alternate route is overlaid on the AR display unit at least at a predefined first distance before a branch-off point;
    generating the AR overlay with an operating option for the driver of the vehicle to selectively overlay an alternate route overview of the at least one alternate route on the AR display unit, and to selectively allow the driver to switch back and forth between the alternate route overview of the at least one alternate route and at least one previous route overview of a previously determined navigation route;
    wherein the AR overlay is generated so that the alternate route overview and the previous route overview displayed on the AR display comprise the entire respective route at least from the current position to the destination.

2. The method of claim 1, comprising generating the AR overlay before the at least one alternate route is overlaid and providing the driver a visual indication of the at least one alternate route with a displayed instruction as to how the driver can have the route overview for the recalculated route overlaid on the AR display unit.

3. The method of claim 2, wherein the AR overlay for the route overview is calculated such that it is zoomable, wherein a zooming operation can be carried out by operating a steering wheel.

4. The method of claim 2, wherein, prior to the route overview being overlaid, a driving situation is assessed and the route overview is only overlaid if the result of the driving situation assessment is that the driving situation does not require increased attention from the driver.

5. The method of claim 2, comprising generating the AR overlay at a certain second distance before the branch-off point and displaying the at least one alternate route next to the previously determined navigation route, wherein a navigation path for one of the two routes extends to the branch-off point and the other navigation path continues past the branch-off point.

6. The method of claim 1, wherein the AR overlay for the route overview is calculated such that it is zoomable, wherein a zooming operation can be carried out by operating a steering wheel.

7. The method of claim 6, wherein, prior to the route overview being overlaid, a driving situation is assessed and the route overview is only overlaid if the result of the driving situation assessment is that the driving situation does not require increased attention from the driver.

8. The method of claim 6, comprising generating the AR overlay at a certain second distance before the branch-off point and displaying the at least one alternate route next to the previously determined navigation route, wherein a navigation path for one of the two routes extends to the branch-off point and the other navigation path continues past the branch-off point.

9. The method of claim 1, wherein, prior to the route overview being overlaid, a driving situation is assessed and the route overview is only overlaid if a result of a driving situation assessment is that the driving situation does not require increased attention from the driver.

10. The method of claim 9, comprising generating the AR overlay at a certain second distance before the branch-off point and displaying the at least one alternate route next to the previously determined navigation route, wherein a navigation path for one of the two routes extends to the branch-off point and the other navigation path continues past the branch-off point.

11. The method of claim 1, comprising generating the AR overlay at a certain second distance before the branch-off point and displaying the at least one alternate route next to the previously determined navigation route, wherein a navigation path for one of the two routes extends to the branch-off point and the other navigation path continues past the branch-off point.

12. The method of claim 11, comprising hiding a route not followed by the vehicle after identifying, by the navigation system, which route the vehicle is following.

13. The method of claim 12, comprising evaluating an activation of a turn signal of the vehicle or a corresponding user input via an operating unit or a spoken command evaluated by the navigation system in order to identify which route the vehicle is following.

14. The method of claim 1, comprising generating the AR overlay for displaying the at least one alternate route with a different color compared to the AR overlay of the previously determined navigation route.

15. The method of claim 14, wherein a route that would take the most time is displayed in a red or orange color, whereas a route that is more attractive in terms of time is displayed in a blue or green color.

16. A non-transitory computer-readable medium including contents that, when executed on a computer, cause the method for calculating the AR overlay for displaying the navigation route on the AR display unit of claim 1 to be executed.

17. A device for displaying an augmented reality (AR) overlay of navigation routes of a vehicle in an immediate field of vision of a driver, comprising:
    an AR display unit;
    a navigation system for determining a navigation route to a destination; and
    a computer for generating the AR overlay; wherein
    the navigation system is configured designed to:
        recurrently determine a current position of the vehicle;
        determine, using the current position, whether at least one alternate route to the destination exists; wherein
    the computer is configured to:
        generate the AR overlay such that an indication of the at least one alternate route is overlaid on the AR display unit at least at a predefined first distance before a branch-off point; and to generate the AR overlay with an operating option for the driver of the vehicle to selectively overlay an alternate route overview of the at least one alternate route on the AR display unit, and to selectively allow the driver to switch back and forth between the alternate route overview of the at least one alternate route and at least one previous route overview of a previously determined navigation route; wherein the AR overlay is generated by the computer so that the alternate route overview and the previous route overview displayed on the AR display comprise the entire respective route at least from the current position to the destination.

18. The device of claim 17, wherein the display unit is a head-up display HUD or smart glasses that can be worn.

19. A motor vehicle, wherein the motor vehicle comprises the device of claim 17.

\* \* \* \* \*